United States Patent
Seo et al.

(10) Patent No.: US 10,170,097 B2
(45) Date of Patent: Jan. 1, 2019

(54) WATERPROOF SOUND TRANSMITTING SHEET, AND METHOD FOR PRODUCING SAME

(71) Applicant: Amogreentech Co., Ltd., Gyeonggi-do (KR)

(72) Inventors: In-Yong Seo, Seoul (KR); Seung-Hoon Lee, Gyeonggi-do (KR); Jun-Sik Hwang, Incheon (KR); Yong-Sik Jung, Gyeonggi-do (KR); Kyung-Su Kim, Gyeonggi-do (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 549 days.

(21) Appl. No.: 14/377,089

(22) PCT Filed: Dec. 11, 2013

(86) PCT No.: PCT/KR2013/011494
§ 371 (c)(1),
(2) Date: Aug. 6, 2014

(87) PCT Pub. No.: WO2014/092459
PCT Pub. Date: Jun. 19, 2014

(65) Prior Publication Data
US 2015/0001000 A1    Jan. 1, 2015

(30) Foreign Application Priority Data

Dec. 11, 2012  (KR) .................. 10-2012-0143370
Dec. 11, 2013  (KR) .................. 10-2013-0153945

(51) Int. Cl.
*G10K 11/18* (2006.01)
*B32B 5/02* (2006.01)
(Continued)

(52) U.S. Cl.
CPC ............... *G10K 11/18* (2013.01); *B32B 5/02* (2013.01); *B32B 5/26* (2013.01); *B32B 7/02* (2013.01);
(Continued)

(58) Field of Classification Search
CPC .......... G10K 11/18; G10K 11/24; B32B 5/02; B32B 5/26; B32B 7/02; B32B 27/12;
(Continued)

(56) References Cited

U.S. PATENT DOCUMENTS

| 4,071,040 A | 1/1978 | Moriarty |
| 4,987,597 A | 1/1991 | Haertl |

(Continued)

FOREIGN PATENT DOCUMENTS

| CN | 101263733 | 9/2008 |
| CN | 101795858 A | 8/2010 |

(Continued)

OTHER PUBLICATIONS

English machine translation of KR 10-2011-0095753 (publication number), which is Korean Application No. 1020100015393.*

(Continued)

*Primary Examiner* — Robert S Walters, Jr.
(74) *Attorney, Agent, or Firm* — Baker & Hostetler LLP

(57) ABSTRACT

Disclosed herein is a waterproof sound-transmitting sheet having high sound transfer efficiency and excellent water proofing performance and a method of producing same. The waterproof sound-transmitting sheet includes: a film-shaped sound-transmitting layer made of a first polymer material; and a webbed pigment layer formed on at least one side of the sound-transmitting layer and made of a second polymer material containing a pigment having a predetermined color, wherein the second polymer material has a melting point higher than that of the first polymer material.

5 Claims, 4 Drawing Sheets

(51) Int. Cl.
  *B32B 5/26* (2006.01)
  *B32B 7/02* (2006.01)
  *B32B 27/12* (2006.01)
  *B32B 27/40* (2006.01)
  *D01D 5/00* (2006.01)
  *G10K 11/24* (2006.01)
  *B32B 27/08* (2006.01)
  *D01F 1/04* (2006.01)

(52) U.S. Cl.
  CPC .............. *B32B 27/08* (2013.01); *B32B 27/12* (2013.01); *B32B 27/40* (2013.01); *D01D 5/0084* (2013.01); *G10K 11/24* (2013.01); *B32B 2262/0238* (2013.01); *B32B 2262/0292* (2013.01); *B32B 2307/10* (2013.01); *B32B 2307/7265* (2013.01); *B32B 2457/00* (2013.01); *B32B 2457/20* (2013.01); *D01F 1/04* (2013.01)

(58) Field of Classification Search
  CPC ..... B32B 27/40; B32B 27/08; B32B 2457/00; B32B 2307/10; B32B 2307/7265; B32B 2262/0238; B32B 2262/0292; B32B 2457/20; D01D 5/0084; D01F 1/04
  See application file for complete search history.

(56) References Cited

U.S. PATENT DOCUMENTS

| | | | |
|---|---|---|---|
| 5,186,996 A | 2/1993 | Alts | |
| 5,187,005 A * | 2/1993 | Stahle | B32B 5/26 442/208 |
| 5,342,434 A | 8/1994 | Wu | |
| 5,460,872 A | 10/1995 | Wu | |
| 5,462,586 A | 10/1995 | Sugiyama | |
| 5,814,405 A | 9/1998 | Branca | |
| 5,828,012 A | 10/1998 | Repolle | |
| 6,512,834 B1 | 1/2003 | Banter | |
| 6,932,187 B2 | 8/2005 | Banter | |
| 7,702,124 B2 | 4/2010 | Niederdraenk | |
| 7,771,818 B2 | 8/2010 | Klare | |
| 7,927,405 B2 | 4/2011 | Bacino | |
| 8,141,678 B2 | 3/2012 | Ikeyama | |
| 8,157,048 B2 | 4/2012 | Banter | |
| 8,272,517 B2 | 9/2012 | Horie | |
| 8,685,198 B2 | 4/2014 | Mietta | |
| 8,731,618 B2 | 5/2014 | Jarvis | |
| 8,739,926 B1 | 6/2014 | Mori | |
| 8,846,161 B2 | 9/2014 | Linford | |
| 9,038,773 B2 | 5/2015 | Banter | |
| 9,044,706 B2 | 6/2015 | Furuyama | |
| 2006/0019099 A1 | 1/2006 | Wang et al. | |
| 2008/0220676 A1 * | 9/2008 | Marin | A41D 31/02 442/76 |
| 2009/0176056 A1 | 7/2009 | Marin | |
| 2010/0247857 A1 | 9/2010 | Sanami | |
| 2011/0209265 A1 | 9/2011 | Komada | |
| 2013/0083528 A1 | 4/2013 | Huang | |
| 2013/0084447 A1 | 4/2013 | Shimatani | |
| 2015/0001000 A1 | 1/2015 | Seo | |
| 2015/0070842 A1 | 3/2015 | Lee | |

FOREIGN PATENT DOCUMENTS

| | | |
|---|---|---|
| CN | 101990493 A | 3/2011 |
| CN | 102186368 | 9/2011 |
| CN | 102318367 | 1/2012 |
| EP | 2335505 A1 | 6/2011 |
| JP | S 55-009859 | 1/1980 |
| JP | 09-195458 | 7/1997 |
| JP | H10-165787 A | 6/1998 |
| JP | 2002-502561 A | 1/2002 |
| JP | 2004-261737 | 9/2004 |
| JP | 2004-328231 A | 11/2004 |
| JP | 2009-137181 A | 6/2009 |
| JP | 2009-279930 A | 12/2009 |
| JP | 2010-241047 A | 10/2010 |
| JP | 2010-247547 A | 11/2010 |
| JP | 2011-052180 | 3/2011 |
| JP | 2012-025160 | 2/2012 |
| KR | 10-2008-0035101 A | 4/2008 |
| KR | 10-2008-0064832 A | 7/2008 |
| KR | 10-2009-0128104 | 12/2009 |
| KR | 10-2009-0130566 A | 12/2009 |
| KR | 10-2010-0024119 A | 3/2010 |
| KR | 10-2010-0041839 | 4/2010 |
| KR | 10-0985515 | 9/2010 |
| KR | 10-2010-0112615 A | 10/2010 |
| KR | 10-2011-0058026 A | 6/2011 |
| KR | 10-2011-0063492 | 6/2011 |
| KR | 10-2011-0074869 | 7/2011 |
| KR | 10-2011-0095753 | 8/2011 |
| KR | 10-2012-0028693 A | 3/2012 |
| KR | 10-2012-0101088 | 9/2012 |
| KR | 10-1204550 | 11/2012 |
| WO | 2011/132062 A1 | 10/2011 |
| WO | 2012/002754 A | 1/2012 |

OTHER PUBLICATIONS

Office Action in Japanese Patent Application No. 2014-552144, dated Jul. 28, 2015.
Office Action in Japanese Patent Application No. 2014-559848, dated Aug. 18, 2015.
Extended Search Report in European Patent Application No. 13862024.0, dated Feb. 9, 2015.
European Patent Application No. 13863628.7: Extended European Search Report dated Jan. 29, 2015, 7 pages.

* cited by examiner

WATERPROOF SOUND TRANSMITTING SHEET, AND METHOD FOR PRODUCING SAME

CROSS-REFERENCE TO RELATED APPLICATIONS

This application is the National Stage of International Application No. PCT/KR2013/011494, filed Dec. 11, 2013, which claims the benefit of and priority to Korean application No. 10-2012-0143370, filed Dec. 11, 2012 and Korean application No. 10-2013-0153945, filed Dec. 11, 2013, the entireties of which applications are incorporated herein by reference for any and all purposes.

TECHNICAL FIELD

The present invention relates to a waterproof sound-transmitting-sheet, and a method for producing same. More particularly, the present invention relates to a waterproof sound-transmitting sheet having a high sound-transmitting efficiency and excellent waterproofness, and a method for producing same.

BACKGROUND ART

Recently, mobile electronic appliances, such as portable terminals, digital cameras and notebooks, have increasingly been used. Such a mobile electronic appliance needs to have a waterproofing property because it is used while being carried. However, such a mobile electronic appliance is configured such that a sound hole is formed in its portion to be provided with a speaker or microphone, and water or dust infiltrates into the mobile electronic appliance through the sound hole.

Therefore, the sound hole is provided therein with a waterproof sound-transmitting sheet for transmitting sound and blocking water or dust. Such a waterproof sound-transmitting sheet must be produced in consideration of both a waterproofing property and a sound-transmitting efficiency.

In relation thereto, Korean Patent Application Publication No. 10-2010-0041839 (Apr. 22, 2010) discloses a waterproof sound-transmitting sheet made of a porous polytetrafluoroethylene film. However, this conventional waterproof sound-transmitting sheet is problematic in that, since it is composed of only a porous polytetrafluoroethylene film, the micropores of the porous polytetrafluoroethylene film are enlarged by externally-applied impact or sound pressure depending on the increase in the period of sheet usage, thus deteriorating the waterproofing performance thereof.

DISCLOSURE

Technical Problem

Accordingly, the present invention has been devised to solve the above-mentioned problem, and the present invention intends to provide a waterproof sound-transmitting sheet with improved waterproofing performance because it includes a nonporous sound-transmitting layer, and a method for producing same.

Further, the present invention intends to easily adjust the thickness of the waterproof sound-transmitting sheet. Particularly, the present invention intends to provide a waterproof sound-transmitting sheet, which can maximize sound-transmitting performance by making a sound-transmitting layer thin, and a method for producing same.

Moreover, the present invention intends to provide a waterproof sound-transmitting sheet having high interlayer adhesivity and a method of for producing same.

Technical Solution

In order to accomplish the above objects, an aspect of the present invention provides a waterproof sound-transmitting sheet, including: a film-shaped sound-transmitting layer made of a first polymer material; and a webbed pigment layer formed on at least one side of the sound-transmitting layer and made of a second polymer material containing a pigment having a predetermined color, wherein the second polymer material has a melting point higher than that of the first polymer material.

Here, the first polymer material may include polyurethane (PU).

Further, the second polymer material may include polyvinylidene difluoride (PVDF).

The waterproof sound-transmitting sheet may further include an adhesion layer, which is formed between the sound-transmitting layer and the pigment layer and is made of the second polymer material.

Further, the pigment layer may include: a first pigment layer formed on one side of the sound-transmitting layer and made of the second polymer material containing a pigment having a predetermined color; and a second pigment layer formed on the other side of the sound-transmitting layer and made of the second polymer material containing a pigment having a predetermined color.

The waterproof sound-transmitting sheet may further include an adhesion layer, which is formed between the sound-transmitting layer and the first pigment layer and is made of the second polymer material.

Further, the first polymer material of the sound-transmitting layer may permeate into an interface between the pigment layer and the sound-transmitting layer.

Further, the total air permeability of the first pigment layer, the sound-transmitting layer and the second pigment layer may be less than 0.1 cfm at 125 psi.

Another aspect of the present invention provides a method for producing a waterproof sound-transmitting sheet, including the steps of: applying a spinning solution containing a pigment having a predetermined color and a second polymer material onto a substrate to form a webbed pigment layer; applying a spinning solution containing a first polymer material having a melting point lower than that of the second polymer material onto the pigment layer to form a webbed sound-transmitting layer; and heat-treating the pigment layer and the sound-transmitting layer to allow the sound-transmitting layer to be melted to reconstruct a layer structure.

The method may further include the step of applying a spinning solution containing the second polymer material onto the pigment layer to form a webbed adhesion layer, between the step of forming the pigment layer and the step of forming the sound-transmitting layer, wherein the pigment layer, the sound-transmitting layer and the adhesion layer are heat-treated.

The method may further include the step of applying a spinning solution containing the second polymer material onto the sound-transmitting layer to form the other webbed pigment layer, between the step of forming the sound-transmitting layer and the step of heat-treating the pigment layer and the sound-transmitting layer.

The method may further include the step of oleophohic-treating the pigment layer and the sound-transmitting layer, after the step of heat-treating the pigment layer and the sound-transmitting layer.

Advantageous Effects

Since the waterproof sound-transmitting sheet according to the present invention includes a nonporous sound-transmitting layer, its waterproofing performance can be more improved.

Further, the total thickness of the waterproof sound-transmitting sheet can be easily adjusted by forming a sound-transmitting layer and a pigment layer using electrospinning. Particularly, the waterproofing performance of the waterproof sound-transmitting sheet can be improved by making the sound-transmitting layer thin. Moreover, since the thickness of the waterproof sound-transmitting sheet can be easily adjusted, the air permeability thereof can also be easily adjusted, thus realizing excellent sound characteristics.

Further, according to the present invention, a waterproof sound-transmitting sheet having strong adhesivity between a sound-transmitting layer and a pigment layer can be produced.

Further, since the waterproof sound-transmitting sheet of the present invention further includes an adhesion layer formed between a sound-transmitting layer and a pigment layer, at the time of separating the waterproof sound-transmitting sheet from a substrate, it is possible to prevent the phenomenon of stripping the sound-transmitting layer and the pigment layer from each other.

BEST MODE

Figure 1:
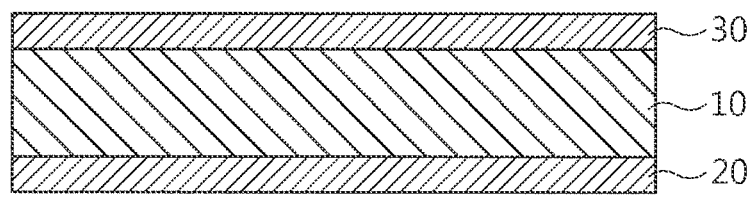
FIG. 1 is a sectional view showing the structure of a waterproof sound-transmitting sheet according to an embodiment of the present invention.

Hereinafter, preferred embodiments of the present invention will be described in detail with reference to the attached drawings. Here, when it is determined that the detailed description of the related art would obscure the gist of the present invention, the description thereof will be omitted. Embodiments of the present invention are provided in order to more clearly explain the present invention to those skilled in the art. Therefore, the shapes, sizes and the like of the elements in the drawing may be exaggerated for more clearly explaining the present invention.

FIG. 1 is a sectional view showing the structure of a waterproof sound-transmitting sheet according to an embodiment of the present invention.

Referring to FIG. 1, the waterproof sound-transmitting sheet according to an embodiment of the present invention includes a sound-transmitting layer 10, a first pigment layer 20 and a second pigment layer 30.

The sound-transmitting layer 10 is made of a first polymer material, and is formed in the shape of a film. In this case, the first polymer material may include polyurethane (PU). The sound-transmitting layer 10, which is a nonporous layer, is configured to allow air to be transferred from one side thereof to the other side thereof. This sound-transmitting layer 10 may be formed by a process including the steps of: electrospinning the first polymer material to form a first polymer material layer having a webbed structure; and heat-treating the first polymer material layer to melt the webbed structure thereof. In this case, the waterproof sound-transmitting sheet 100 including the first pigment layer 20, the sound-transmitting layer 10 and the second pigment layer 30 may be formed to have an air permeability of 0.1 cfm at 125 psi.

The thickness of the sound-transmitting layer 10 is easily adjusted because it is formed by electrospinning. Particularly, the total sound-transmitting property of the waterproof sound-transmitting sheet 100 becomes excellent because the thickness of the sound-transmitting layer 10 is easily decreased by an electrospinning process. Generally, a porous waterproof sound-transmitting sheet is relatively somewhat sensitive to the degree of thickness thereof because sound is transferred through pores. In contrast, the nonporous waterproof sound-transmitting sheet 100 can effectively transfer sound vibration from one side thereof to the other side thereof only when it is made thin.

Further, the nonporous waterproof sound-transmitting sheet 100 can exhibit high waterproofing performance compared to a waterproof sound-transmitting sheet including a porous sound-transmitting layer because it includes the nonporous sound-transmitting layer 10.

The first pigment layer 20 is formed on one side of the sound-transmitting layer 10. Further, the first pigment layer 20 is made of a second polymer material containing a pigment having a predetermined color. In this case, the second polymer material may have a melting point higher than that of the first polymer material constituting the sound-transmitting layer 10. This second polymer material may include polyvinylidene difluoride (PVDF).

Moreover, each of the first and second polymer materials may include: polyimide, polyimide, polyamideimide, poly(meta-phenylene isophthalamide), polysulfone, polyether ketone, polyether imide, aromatic polyesters such as polyethylene terephthalate, polytrimethylene terephthalate and polyethylene naphthalate, polytetrafluoroethylene, polyphosphazenes such as polydiphenoxyphosphazene and poly{bis[2-(2-methoxyethoxy)phosphazene]}, polyurethane and copolymers thereof, cellulose acetate, cellulose acetate butylate, and cellulose acetate propionate. Further, each of the first and second polymer materials may also include: polyvinylidenefluoride (PVDF), poly(vinylidenefluoride-co-hexafluoropropylene), perfluoropolymers, polyvinylchloride or polyvinylidenechloride and copolymers thereof, polyethyleneglycol derivatives including polyethyleneglycol dialkyl ether and polyethyleneglycol dialkyl ester, poly(oxymethylene-oligo-oxyethylene), polyoxides including polyethylene oxide and polypropylene oxide, polyvinyl acetate, poly(vinylpyrrolidone-vinylacetate), polystyrene and a polystyrene-acrylonitrile copolymer, polyacrylontrile, a polyacrylonitrile-methylmethacrylate copolymer, polymethylmethacrylate, a polymethylmethacrylate copolymer, and mixtures thereof. Even in this case, the melting point of the second polymer material is higher than that of the first polymer material.

The first pigment layer 20 may be formed in the shape of a web. More specifically, the first pigment layer 20 is formed by a process including the steps of: electrospinning the second polymer material containing a pigment having a predetermined color onto one side of the sound-transmitting layer 10 to make ultrafine fiber strands; and accumulating these ultrafine fiber strands to make a structure having a plurality of pores. This first pigment layer 20 serves as a color layer of the waterproof sound-transmitting sheet 100. In this case, various colors of pigment may be used according to the kind of appliances of the waterproof sound-transmitting sheet 100. Further, the first pigment layer 20 is formed in the shape of a web which is an assembly of fiber strands, thus realizing surface waterproofing performance.

The waterproof sound-transmitting sheet 100 according to an embodiment of the present invention can reduce the consumption of pigment because only the first pigment layer 20 and the second pigment layer 30, which are exposed to the outside when this sheet 100 is attached to an electronic appliance, are made of a polymer material containing a pigment. The second pigment layer 30 is formed on the other side of the sound-transmitting layer 10. This second pigment layer 30 may be formed by electrospinning the same polymer material as the first pigment layer 20, except that the position of the second pigment layer 30 is different from that of the first pigment layer 20 with respect to the sound-transmitting layer 10. Therefore, a detailed description of the second pigment layer 30 is replaced by that of the first pigment layer 20.

The waterproof sound-transmitting sheet 100 according to an embodiment of the present invention is configured such that the first pigment layer 20 and the second pigment layer 30 are formed on both sides of the sound-transmitting layer 10, but may be configured such that a pigment layer is formed on only one side of the sound-transmitting layer 10 according to the kind of appliances thereof.

Meanwhile, the heat treatment of the sound-transmitting layer 10 is performed after laminating all the sound-transmitting layer, first pigment layer 20 and second pigment layer 30. Therefore, the polymer material of the sound-transmitting layer 10 melts and permeates into the pores of webbed structures of the first pigment layer 20 and the second pigment layer 30 to obtain stronger interlayer adhesion. The sound-transmitting layer 10, the first pigment layer 20 and the second pigment layer 30 are shown in FIG. 1 as if they are clearly divided. However, the reason for this is that the waterproof sound-transmitting sheet 100 according to an embodiment of the present invention is simplified in FIG. 1. That is, the first polymer material of the sound-transmitting layer 10 permeates into the interface between the first pigment layer 20 and the sound-transmitting layer 10 and the interface between the second pigment layer 30 and the sound-transmitting layer 10. As such, the first polymer material of the sound-transmitting layer 10 permeates into the webbed structures of the first pigment layer 20 and the second pigment layer 30, and is then solidified by heat treatment, thus increasing interlayer adhesion.

Hereinafter, a waterproof sound-transmitting sheet according to another embodiment of the present invention will be described in detail.

Figure 2:
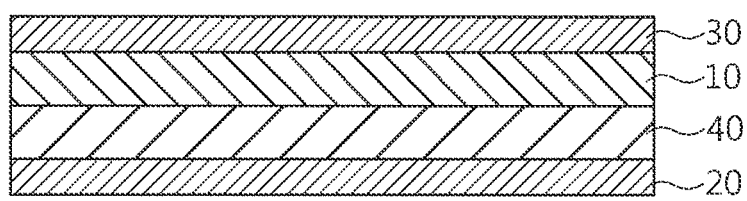
FIG. 2 is a sectional view showing the structure of a waterproof sound-transmitting sheet according to another embodiment of the present invention.
Figure 3:
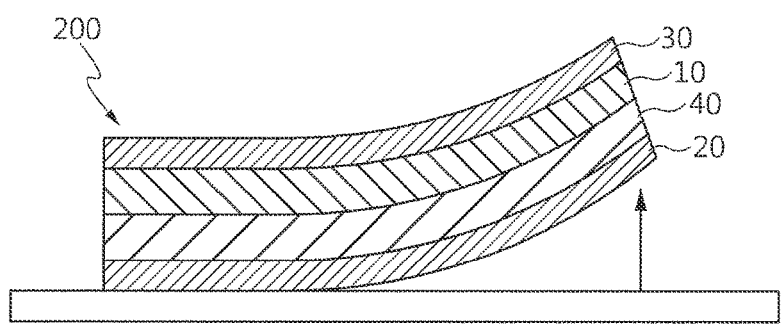
FIG. 3 is a sectional view explaining a process for separating the waterproof sound-transmitting sheet of FIG. 2 from a substrate.

FIG. 2 is a sectional view showing the structure of a waterproof sound-transmitting sheet according to another embodiment of the present invention. FIG. 3 is a sectional view explaining a process for separating the waterproof sound-transmitting sheet of FIG. 2 from a substrate.

Referring to FIGS. 2 and 3, the waterproof sound-transmitting sheet 200 according to another embodiment of the present invention is characterized in that the waterproof sound-transmitting sheet 100 of FIG. 1 further includes an adhesion layer 40. Therefore, hereinafter, the waterproof sound-transmitting sheet 200 according to another embodiment of the present invention will be described based on the adhesion layer 40. Further, throughout the accompanying drawings, the same reference numerals are used to designate the same or similar components, and redundant descriptions thereof are omitted.

The waterproof sound-transmitting sheet 200 according to another embodiment of the present invention includes a sound-transmitting layer 10, a first pigment layer 20, a second pigment layer 30 and an adhesion layer 40.

The adhesion layer 40 is disposed between the sound-transmitting layer 10 and the first pigment layer 20. Further, the adhesion layer 40 may be a webbed layer formed by electrospinning a polymer material. In this case, the polymer material constituting the adhesion layer 40 may be the same as the second polymer material constituting the first pigment layer 20. That is, the adhesion layer may be made of a material containing polyvinylidene fluoride.

This adhesion layer 40 may be formed on one side of the sound-transmitting layer 10, under which a substrate is placed, at the time of electrospinning. The adhesivity between the first pigment layer 20 and the sound-transmitting layer 10 may be relatively low because the second polymer material of the first pigment layer 20 includes a pigment. Therefore, at the time of separating the waterproof sound-transmitting sheet 200 from the substrate, the sound-transmitting layer 10 and the first pigment layer 20 may be separated. In order to prevent the separation of the sound-transmitting layer 10 and the first pigment layer 20, the adhesion layer 40 made of a polymer material having strong adhesivity is formed between the sound-transmitting layer 10 and the first pigment layer 20, thus improving the interlayer adhesivity of the waterproof sound-transmitting sheet 200. FIG. 3 shows a procedure of separating the waterproof sound-transmitting sheet 200 from the substrate.

Hereinafter, a method of producing a waterproof sound-transmitting sheet according to an embodiment of the present invention will be described.

Figure 4:
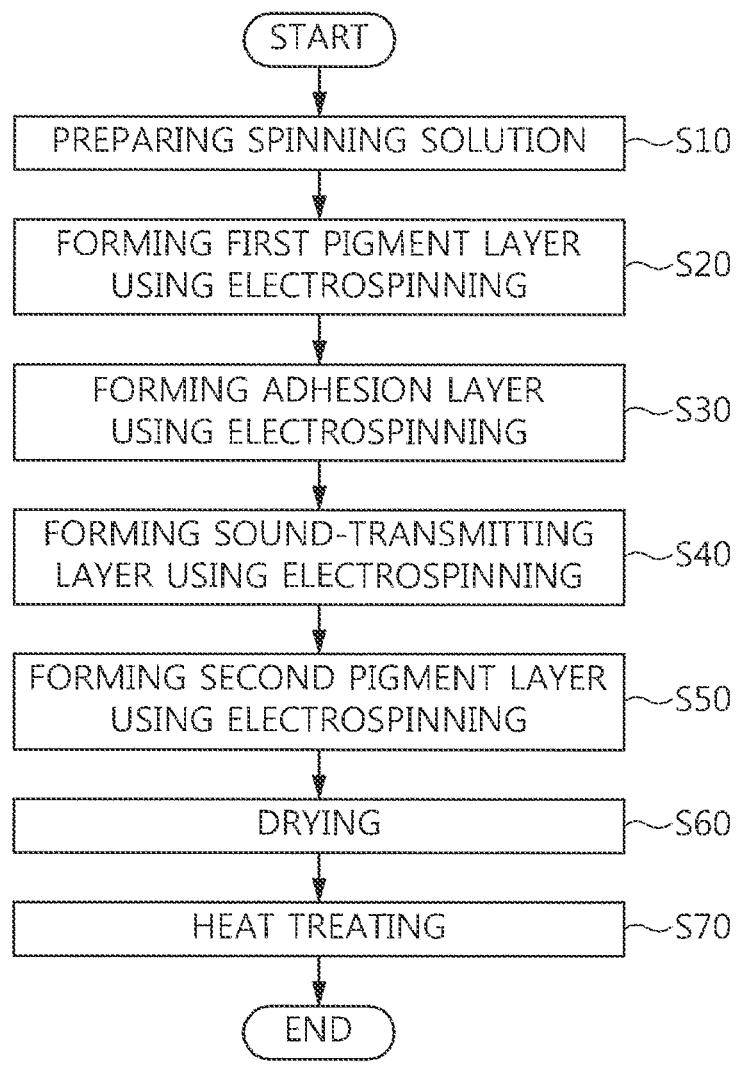
FIG. 4 is flowchart explaining a method of producing a waterproof sound-transmitting sheet according to an embodiment of the present invention.

FIG. 4 is flowchart explaining a method of producing a waterproof sound-transmitting sheet according to an embodiment of the present invention.

Referring to FIG. 4, in the method of producing a waterproof sound-transmitting sheet according to an embodiment of the present invention, first, spinning solutions for forming a sound-transmitting layer, a first pigment layer, a second pigment layer and an adhesion layer are respectively prepared (S10). In this case, the melting point of a polymer material for the sound-transmitting layer is lower than that of a polymer material for forming the first pigment layer, the second pigment layer and the adhesion layer. More specifically, in the spinning solution, the sound-transmitting layer may be formed based on polyurethane, the first pigment layer and the second pigment layer may be formed based on a material including polyvinylidene fluoride and a pigment, and the adhesion layer may be formed based on polyvinylidene fluoride.

Subsequently, an electrospinning process for forming a waterproof sound-transmitting sheet is carried out. First, the spinning solution for forming a first pigment layer is applied onto a substrate to form a first webbed pigment layer (S20).

Then, the spinning solution for forming an adhesion layer is applied onto the first webbed pigment layer to form a webbed adhesion layer (S30). Then, the spinning solution for forming a sound-transmitting layer is applied onto the webbed adhesion layer to form a webbed sound-transmitting layer (S40). Thereafter, the spinning solution for forming a second pigment layer is applied onto the webbed sound-transmitting layer to form a second webbed pigment layer (S50).

Subsequently, the waterproof sound-transmitting sheet formed through the steps of S10 to S50 is dried (S60). In this case, the drying may be conducted by an infrared lamp.

Subsequently, the dried waterproof sound-transmitting sheet is heat-treated to melt only the sound-transmitting layer, thereby forming a nonporous waterproof sound-transmitting sheet (S70). More specifically, the waterproof sound-transmitting sheet, which was dried at a temperature higher than the melting point of the polymer material constituting the sound-transmitting layer and lower than the melting point of the polymer material constituting each of the first pigment layer, second pigment layer and adhesion layer, is heat-treated to form the webbed sound-transmitting layer into a nonporous film layer whose pores are plugged. In this case, by the heat treatment, the polymer material of the sound-transmitting layer permeates into the webbed structures of the adhesion layer and the second pigment layer and is then solidified.

After the step S70. The oleophobic treatment of the nonporous waterproof sound-transmitting, sheet may further be conducted.

Figure 5:
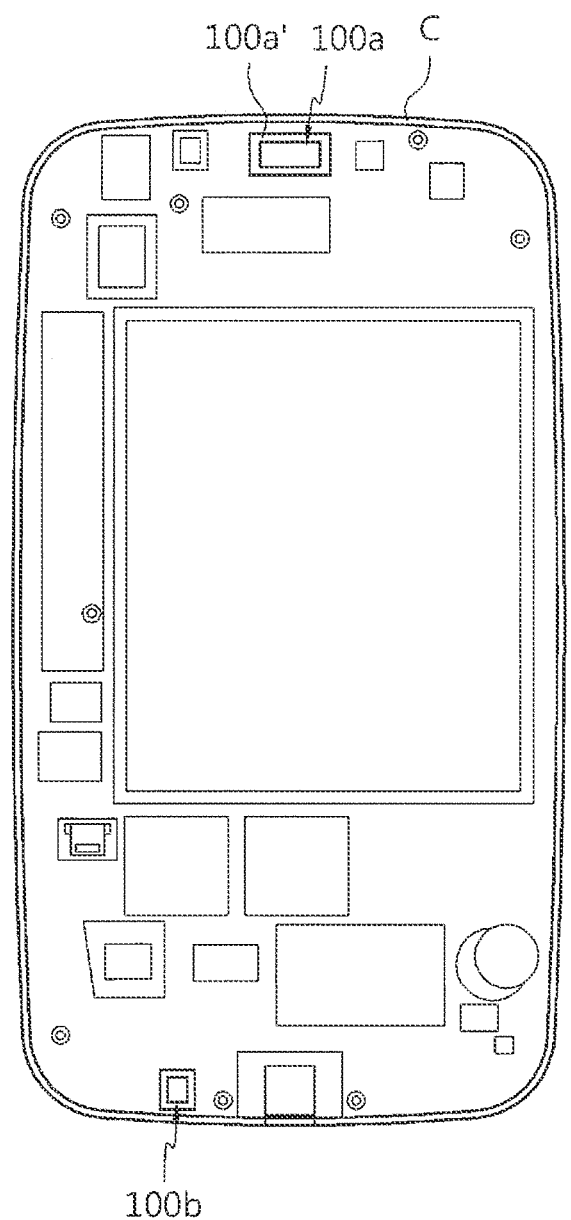
FIG. 5 is a schematic diagram showing an electronic appliance provided with the waterproof sound-transmitting sheet according to the embodiment of the present invention.

FIG. 5 is a schematic view showing an electronic appliance provided with the waterproof sound-transmitting sheet according to the embodiment of the present invention.

Referring to FIG. 5, the inside of the case (C) of an electronic appliance, that is, a mobile terminal is shown. In the case (C) of the mobile terminal, the waterproof sound-transmitting sheet 100a or 100b according to an embodiment of the present invention is applied to a sound hole, that is, a mike or speaker hole. In this case, a support frame 100a' for supporting a shape may be formed on the circumference of the waterproof sound transmitting sheet 100a. In FIG. 5, the full lines in the case (C) indicate circuits, cases and the like formed in the mobile terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of producing a waterproof sound-transmitting sheet, comprising the steps of:
applying a spinning solution containing a pigment having a predetermined color and a second polymer material onto a substrate to form a webbed pigment layer;
applying a spinning solution containing a first polymer material having a melting point lower than that of the second polymer material onto the pigment layer to form a webbed sound-transmitting layer; and
heat-treating the pigment layer and the sound-transmitting layer to melt the sound-transmitting layer and form the waterproof sound-transmitting sheet into a nonporous sheet.

2. The method of claim 1, wherein the first polymer material includes polyurethane (PU).

3. The method of claim 2, wherein the second polymer material includes polyvinylidene difluoride (PVDF).

4. A method of producing a waterproof sound-transmitting sheet, comprising the steps of:
applying a spinning solution containing a pigment having a predetermined color and a second polymer material onto a substrate to form a webbed pigment layer;
applying a spinning solution containing the second polymer material onto the pigment layer to form a webbed adhesion layer;
applying a spinning solution containing a first polymer material having a melting point lower than that of the second polymer material onto the webbed adhesion layer to form a webbed sound-transmitting layer; and
heat-treating the pigment layer, the sound-transmitting layer and the adhesion layer to melt the sound-transmitting layer and form the waterproof sound-transmitting sheet into a nonporous sheet.

5. A method of producing a waterproof sound-transmitting sheet, comprising the steps of:
applying a spinning solution containing a pigment having a predetermined color and a second polymer material onto a substrate to form a first webbed pigment layer;
applying a spinning solution containing a first polymer material having a melting point lower than that of the second polymer material onto the first pigment layer to form a webbed sound-transmitting layer;
applying a spinning solution containing the second polymer material onto the sound-transmitting layer to form a second webbed pigment layer; and heat-treating the first pigment layer, the second pigment layer and the sound-transmitting layer to melt the sound-transmitting layer and form the waterproof sound-transmitting sheet into a nonporous sheet.

* * * * *